Patented Jan. 9, 1951

2,537,647

UNITED STATES PATENT OFFICE 2,537,647

REARRANGEMENT OF TERPENYL ARYL ETHERS

Leland J. Kitchen, Akron, Ohio, assignor to The Firestone Tire & Rubber Company, Akron, Ohio, a corporation of Ohio No Drawing. Application February 21, 1948, Serial No. 10,184

7 Claims. (Cl. 260—619)

This invention relates to the rearrangement of isobornyl aryl ethers to produce isobornyl phenols. It includes the preparation of isobornyl aryl ethers and their rearrangement to produce a substantially pure isobornyl phenol or a mixture of isobornyl phenols. The yield approaches 100 per cent. If more than one of the three reactive positions of the phenol—2,4 and 6—is unsubstituted some disproportionation takes place.

According to this invention the rearrangement is effected by heating the ether, or the ether dissolved in a solvent substantially inert to the reaction under the conditions of the reaction, in the presence of an acid catalyst at a temperature of 70 to 160° C. and preferably at a temperature of 85 to 115° C. until the rearrangement is effected. The time required to bring about the rearrangement will depend upon the temperature employed, the concentration and nature of the catalyst, the solvent, etc.

The catalysts which may be employed are acid catalysts which include, for example, boron trihalides and their complexes, aluminum halides, zinc chloride, stannic chloride, the various sulfonic acid catalysts such as benzenesulfonic acid, toluenesulfonic acid, xylenesulfonic acid and naphthalenesulfonic acid, phosphoric acid, sodium acid sulfate, etc. A preferred catalyst is boron trifluoride, which may be used alone or in the form of one of its complexes, as with diethyl ether, dimethyl ether, methanol, acetic acid, methyl acetate, etc. However, at reaction temperatures much above 90° C., as at 95° C. or higher, boron trifluoride readily is lost from the reaction mixture during reaction; and at temperatures at which boron trifluoride is lost readily it is desirable to utilize a nonvolatile catalyst, such as benzenesulfonic acid, or to carry out the reaction in a closed vessel, thus preventing loss of gaseous boron trifluoride.

The isobornyl ethers which can thus be rearranged to the corresponding phenols include, for example—

| Ethers | Phenols |
|---|---|
| Isobornyl phenyl ether | o-Isobornylphenol.<br>p-Isobornylphenol.<br>2,4-Diisobornylphenol.<br>2,4,6-Triisobornylphenol. |
| Isobornyl p-cresyl ether | 2-Isobornyl-4-methylphenol.<br>2,6-Diisobornyl-4-methylphenol. |
| Isobornyl o-cresyl ether | 2-Methyl-4-isobornylphenol.<br>2-Methyl-4,6-diisobornylphenol. |
| Isobornyl 2,4-dimethylphenyl ether | 2,4-Dimethyl-6-isobornylphenol. |
| Isobornyl 2,6-dimethylphenyl ether | 2,6-Dimethyl-4-isobornylphenol. |
| Isobornyl 4-chlorophenyl ether | 2-Isobornyl-4-chlorophenol.<br>2,6-Diisobornyl-4-chlorophenol. |
| Isobornyl 2,4-dichlorophenyl ether | 2,4-Dichloro-6-isobornylphenol. |
| Isobornyl 4-bromophenyl ether | 2-Isobornyl-4-bromophenol.<br>2,6-Diisobornyl-4-bromophenol. |
| Isobornyl 2-bromophenyl ether | 2-Bromo-isobornylphenol.<br>2-Bromo-4,6-diisobornylphenol. |
| Isobornyl 2,4-dibromophenyl ether | 2,4-Dibromo-6-isobornylphenol. |
| Isobornyl 2-methyl-4-chlorophenyl ether | 2-Myethyl-4-chloro-6-isobornylphenol |
| Isobornyl 4-fluorophenyl ether | 2-Isobornyl-4-fluorophenol.<br>2,6-Diisobornyl-4-fluorophenol. |
| Isobornyl 4-methoxyphenyl ether | 2-Isobornyl-4-methoxyphenol.<br>2,6-Diisobornyl-4-methoxyphenol.<br>3-Methyl-4-isobornylphenol. |
| Isobornyl m-cresyl ether | 2-Isobornyl-5-methylphenol.<br>2,4-Diisobornyl-5-methylphenol. |
| Isobornyl 4-nitrophenyl ether | 2-Isobornyl-4-nitrophenol.<br>2,6-Diisobornyl-4-nitrophenol. |
| Isobornyl beta-naphthyl ether | Isobornyl-beta-naphthol. |
| Hydroquinone diisobornyl ether | 2-Isobornylhydroquinone.<br>2,5-Diisobornylhydroquinone. |
| Catechol monoisobornyl ether | 4-Isobornylcatechol.<br>4,6-Diisobornylcatechol. |
| Isobornyl 4-tert-amylphenyl ether | 2-Isobornyl-4-tert.-amylphenol.<br>2,6-Diisobornyl-4-tert.-amylphenol. |
| Isobornyl 4-(2-ethoxyethoxy)-phenyl ether. | 2-Isobornyl-4-(2-ethoxyethoxy) phenol.<br>2,6-Diisobornyl-4-(2-ethoxyethoxy) phenol. |
| Isobornyl 4-ethylphenyl ether | 2-Isobornyl-4-ethylphenol.<br>2,6-Diisobornyl-4-ethylphenol. |

The rearrangement of the isobornyl aryl ethers is valuable as affording a method of producing isobornyl phenols in a relatively good yield. The invention thus includes the production of isobornyl phenols by first producing an isobornyl aryl ether from a phenol and either camphene or tricyclene, carrying out the reaction at a low temperature and in the presence of an acid catalyst to obtain a high yield of the ether, with subsequent rearrangement of the ether to produce the isobornyl phenol. Using the prior-art methods of carrying out the reaction at higher temperatures, polymerization occurs and the yield is low, whereas in the present process concentration of camphene and of unisobornylated phenol are low at all times during the reaction, thus providing a more uniform catalyst activity and less side reaction.

Another advantage of the invention is that the process provides a method for preparing isobornyl phenols of high purity from phenols contaminated with isomers which cannot readily be separated by subjecting the intermediate ether to purification, as by distillation or recrystallization. Thus, when 2,4-dimethylphenol, B. P. 210° C., is separated from coal tar, it is exceedingly difficult to remove the last traces of 2,5-dimethylphenol, B. P. 210° C. However, the intermediate isobornyl 2,4-dimethylphenyl ether readily can be recrystallized, followed by conversion to the isomeric isobornyl phenol of high purity. The process is particularly valuable in this connection when it is considered that the crystalline ethers are much more readily purified by recrystallization than are the original phenols or the isobornyl phenols. Most of the ethers, particularly those containing ortho substituents or large para substituents, are crystalline.

The intermediate ether need not be isolated or purified. According to this invention, the ether produced at temperatures not over about 35° C. may be subjected to rearrangement without purification. Thus it is possible to effect condensation of camphene or tricyclene with a phenol at reduced temperature in presence of a small amount of acid catalyst, following which the temperature can be raised and sufficient additional catalyst added to effect rearrangement.

The invention is illustrated by the following examples:

EXAMPLE 1

*Isobornyl phenol*

272 grams camphene were mixed with 188 grams of phenol. To the stirred mixture maintained at a temperature between −1 and +15° C. was added 6.5 grams of a 45 per cent solution of boron fluoride in ether. In 120 minutes the reaction was stopped by addition of aqueous alkali. Distillation yielded isobornyl phenyl ether, a water-white liquid with a faint odor. The yield was 82 per cent of isobornyl phenyl ether. Boiling point was 151° C./10 mm. $n_D^{20}$=1.5265.

The rearrangement was effected with a catalyst. Two hundred grams of isobornyl phenyl ether obtained as above, by distillation from the reaction mixture, and 2 grams of a 45 per cent solution of boron fluoride in ether were added to 300 ml. of benzene. The mixture was heated to refluxing (90° C.) and a vigorous reaction took place. Refluxing was continued 7 hours. The catalyst and free phenol (about 33 grams) were extracted with 5 per cent NaOH. A middle layer which formed was acidified and combined with the oil layer which was distilled through a one-foot fractionating column containing Raschig rings. Fifty-three grams of monoisobornyl phenol were obtained. On distillation, the purest fraction (9 grams), a viscous, almost colorless liquid had a boiling point of 179–180° C./10 mm. $n_D^{20}$=1.5514. On cooling it crystallized to a white solid. Recrystallized from petroleum ether, it had melting point 77.8–78.6°; analyzed for carbon and hydrogen: calculated for monoisobornyl phenol, C=83.42%, H=9.63%; found, C=83.87% and H=9.86%.

Further distillation of the reaction mixture yielded 39 g. diisobornylphenol, B. P. 231–256° C./5 mm., and 30 g. triisobornylphenol, B. P. 275–325° C./3 mm., both being collected as light yellow transparent resins.

EXAMPLE 2

*2-isobornyl-4-methylphenol*

220 grams of p-cresol was mixed with 214 grams of camphene and 9 grams of a 45 per cent ether solution of boron fluoride. The reaction mixture was kept below 10° C. for eleven days. A somewhat viscous liquid with a light-yellow tinge and a slight odor was obtained in a yield of 95 per cent. The isobornyl p-cresyl ether has a boiling point of 164.5° C./10 mm.; $n_D^{20}$=1.5190.

The ether was refluxed in benzol with ether solution of boron fluoride as catalyst, as in Example 1. Two hundred grams of the ether yielded 30 grams of 2-isobornyl-4-methylphenol, boiling at 187–191° C./10 mm., $n_D^{20}$=1.5394, a viscous oil which crystallized. Recrystallized from petroleum ether, it melted at 71.8–72.5° C. It was analyzed for carbon and hydrogen: calculated for $C_{17}H_{24}O$: C=83.55%, H=9.90%; found: C=83.16%, H=9.89%.

Further distillation of the reaction mixture yielded 87 g. of 2,6-diisobornyl-4-methylphenol, a light-yellow resin of B. P. 254–276° C./10 mm.

EXAMPLE 3

*2,4-dimethyl-6-isobornylphenol*

A solution of camphene dissolved in an equivalent amount of 2,4-dimethylphenol (technical grade contaminated with isomers including 2,5-dimethylphenol) was treated with 2 per cent of benzene sulfonic acid (70 per cent) at a temperature of 0 to 5° C. and allowed to stand for several days. Isobornyl 2,4-dimethylphenyl ether contaminated with isomers was obtained in high yield. The ether was obtained in a state of relatively high purity (M. P. 57.6–57.8° C.) by recrystallization from 3:1 alcohol acetone.

One kilogram of the recrystallized ether dissolved in 500 ml. benzene was refluxed five hours with 10 g. catalyst consisting of 45 per cent solution of boron fluoride in ether. Reaction was so vigorous at first that water-bath cooling was necessary. The reaction mixture, extracted with 5 per cent NaOH to remove catalyst and dimethylphenol, was analyzed by fractional distillation; yields of products were 2,4-dimethyl-6-isobornylphenol, 87 per cent; unreacted ether, 5 per cent; 2,4-dimethylphenol, 1.2 per cent; and residue, 3.7 per cent. The product boiled mainly at 193.5–196.5° C./10 mm.; it was a highly viscous liquid with a faint yellow tinge which crystallized on cooling; $n_D^{20}$=1.5414 (super cooled liquid); B. P. 196° C./10 mm.; M. P. 829–83.0° C. (soft chalky-white crystals from petroleum ether). Anal. calcd. for $C_{18}H_{26}O$: C, 83.66%; H, 10.14%; M. W., 258.4. Found: C, 83.27%; H, 10.27%; M. W. 258 (micro-Rast).

EXAMPLE 4

200 g. isobornyl 2,4-dimethylphenyl ether dissolved in 300 ml. carbon tetrachloride was heated at 90° with 2 grams BF₃-ether catalyst for 5¾ hours. A 73 per cent yield of 2,4-dimethyl-6-isobornyl phenol was obtained from the reaction mixture.

EXAMPLE 5

The experiment of Example 4 was carried out with 300 ml. cyclohexane as the diluent. The yield of 2,4-dimethyl-6-isobornyl phenol was 75 per cent.

Thus on rearrangement of the isobornyl ether of 2,4-dimethyl phenol substantially 100 per cent conversion to 2,4-dimethyl-6-isobornyl phenol is produced in a high degree of purity. When a mixture of products is obtained, as in the rearrangement of a terpene unsubstituted- or mono-substituted ether, the products may be separated by fractional distillation or other suitable means, or the mixture may be used. The invention is not confined to the examples given but is merely illustrated thereby and is defined in the claims which follow.

What I claim is:

1. The process of rearranging an isobornyl aryl ether which comprises heating the same in the presence of an acid catalyst at a temperature of 70 to 160° C.

2. The process of rearranging an isobornylphenyl ether which comprises heating the same in an inert solvent in the presence of an acid catalyst at a temperature of 85 to 115° C.

3. The process of rearranging an isobornyl aryl ether which comprises refluxing the same in benzene solution at atmospheric pressure in the presence of boron trifluoride.

4. The process of producing a high yield of isobornyl-2,4-dialkylphenol which comprises heating a solution of an isobornyl-2,4-dialkylphenyl ether in the presence of an acid catalyst at a temperature of 85 to 115° C.

5. The process of producing a high yield of 6-isobornyl-2,4-dimethylphenol which comprises heating a solution of isobornyl 2,4-dimethylphenyl ether in the presence of an acid catalyst at a temperature of 85 to 115° C.

6. The process of producing an isobornyl phenol which comprises heating a phenol with a terpene of the class consisting of camphene and tricyclene in solution in the presence of an acid catalyst at a temperature of −30 to +35° C. to produce an aryl ether and then heating the resulting solution at a temperature of 70 to 160° C. to effect rearrangement of the ether to the isobornyl phenol.

7. The process of producing from an alkylphenol contaminated with isomers, an isobornyl alkylphenol the isomeric ether of which is a solid, which comprises heating the alkylphenol contaminated with isomers, with a terpene of the class consisting of camphene and tricyclene, in solution in the presence of an acid catalyst at a temperature of −30 to +35° C. to produce the solid ether contaminated with isomers, recovering and recrystallizing the ether to free it of isomers, and then heating the recrystallized ether in an inert solvent in the presence of an acid catalyst at a temperature of 85 to 115° C. to effect rearrangement of the ether to the isobornyl phenol.

LELAND J. KITCHEN.

REFERENCES CITED

The following references are of record in the file of this patent:

UNITED STATES PATENTS

| Number | Name | Date |
|---|---|---|
| 2,145,369 | Osterhof | Jan. 31, 1939 |
| 2,242,250 | Honel et al. | May 20, 1941 |
| 2,289,550 | Roblin, Jr. | July 14, 1942 |

FOREIGN PATENTS

| Number | Country | Date |
|---|---|---|
| 598,298 | Germany | June 8, 1934 |

OTHER REFERENCES

Byers, Jr.: Synthetic Orangic Chemicals vol. 19, No. 4, 1–2 (1947).

Sowa et al..: Jour. Am. Chem. Soc., vol. 54, 3694–8 (1932).

Lefebvre: Chem. Abs., vol. 40, 2817–8 (1946) also in Compte Rendu, vol. 221, 301–3 and 355–7 (1945).